United States Patent
Barnett (10) Patent No.: US 6,555,778 B1
(45) Date of Patent: Apr. 29, 2003

(54) PLASMA ENHANCED SHEET BONDING METHOD AND DEVICE

(75) Inventor: Ronald J. Barnett, Santa Rosa, CA (US)

(73) Assignee: GeoMat Insights, LLC, Santa Rosa, CA (US)

( * ) Notice: Subject to any disclaimer, the term of this patent is extended or adjusted under 35 U.S.C. 154(b) by 0 days.

(21) Appl. No.: 09/996,034

(22) Filed: Nov. 19, 2001

(51) Int. Cl.[7] .............................................. B23K 10/00
(52) U.S. Cl. ............................ 219/121.45; 219/121.59; 219/121.46; 156/272.2
(58) Field of Search ........................ 219/121.59, 121.52, 219/121.37, 121.45, 121.46; 156/272.2, 244.22, 244.23, 244.24, 282, 273.9, 275.9, 275.7

(56) References Cited

U.S. PATENT DOCUMENTS

| | | | | |
|---|---|---|---|---|
| 4,511,419 A | * | 4/1985 | Kuhlmann et al. | 156/272.6 |
| 5,110,387 A | * | 5/1992 | Jasinki et al. | 156/222 |
| 5,913,999 A | * | 6/1999 | Hayashida et al. | 156/272.2 |
| 6,146,480 A | * | 11/2000 | Centanni et al. | 156/151 |
| 6,273,984 B1 | * | 8/2001 | Bourdelaiss et al. | 156/244.22 |

* cited by examiner

*Primary Examiner*—Mark Paschall
(74) *Attorney, Agent, or Firm*—The Law Offices of Jessica Costa, PC; Jessica Costa (57) ABSTRACT

A method and apparatus for bonding solid sheets together is presented. A modulated directional flow of plasma is applied at and between the bonding surfaces of the sheets to be bonded prior to and during the application of pressure to compress the bonding surfaces together to form a direct contact or diffusion bond.

34 Claims, 8 Drawing Sheets

PLASMA ENHANCED SHEET BONDING METHOD AND DEVICE

CROSS-REFERENCE TO RELATED APPLICATIONS

This application is related to copending applications as follows: U.S. Application Serial No. UNKNOWN, entitled PLASMA ENHANCED SHEET BONDING METHOD AND DEVICE, U.S. Application Serial No. UNKNOWN, entitled PLASMA ENHANCED COMPONENT ATTACH METHOD AND DEVICE, U.S. Application Serial No. UNKNOWN, entitled PLASMA ENHANCED CIRCUIT PACKAGING METHOD AND DEVICE, U.S. Application Serial No. UNKNOWN, entitled PLASMA ENHANCED METAL SHEET BONDING METHOD AND DEVICE, all filed herewith, and U.S. Pat. No. 6,320,155, entitled PLASMA ENHANCED WIRE BONDER, filed Nov. 20, 2001, each of which is incorporated by reference for all that they teach.

FIELD OF THE INVENTION

The present invention pertains generally to material bonding, and more particularly, to a method and apparatus for using hot plasma gas to simultaneously heat, clean, and activate the bonding surfaces of bondable solid sheets before and during bonding of the sheets together.

BACKGROUND OF THE INVENTION

Various techniques exist for bonding materials together. For materials comprising metals, bonding techniques include welding, brazing, soldering, and more recently, direct contact and diffusion bonding. For materials comprising non-metal solids, bonding techniques typically include using some type of adhesive such as an epoxy.

Welding is a metal joining process wherein coalescence is produced by heating the metal to suitable temperatures, with or without the application of pressure and with or without the use of filler metals. Coalescence is a growing together into one body. A weld is the junction of sheets or the edges of sheets which are to be joined or have been joined by melting and refreezing at the contact interfaces of sheets themselves. Filler metal is the material to be added in making a welded, brazed, or soldered joint. Base metal is the material to be welded, soldered, or cut.

The term arc welding applies to a large and varied group of processes that use an electric arc as the source of heat to melt and join metals together as the molten metal re-freezes. In arc welding processes, the joining of metals, or weld, is produced by the extreme heat of an electric arc drawn between an electrode and the work-piece, or between two electrodes. The formation of a joint between metals being arc welded may or may not require the use of pressure or filler metal. The arc is struck between the workpiece and an electrode that is mechanically or manually moved along the joint, or that remains stationary while the workpiece is moved underneath it. The electrode is either a consumable wire rod or a nonconsumable carbon or tungsten rod which carries the current and sustains the electric arc between its tip and the workpiece. When a nonconsumable electrode is used, a separate rod or wire can supply filler material, if needed. A consumable electrode is specially prepared so that it not only conducts the current and sustains the arc, but also melts and supplies filler metal to the joint, and may produce a slag covering as well.

Gas welding processes are a group of welding processes in which a weld is made by heating with a gas flame. Pressure and/or filler metal may or may not be used. Also referred to as oxyfuel gas welding, the term gas welding is used to describe any welding process that uses a fuel gas combined with oxygen, or in rare cases, with air (20% Oxygen), to produce a flame having sufficient energy to melt the base metal. The fuel gas and oxygen are mixed in the proper proportions in a chamber, which is generally a part of the welding tip assembly. The torch is designed to give the welder complete control of the welding flare, allowing the welder to regulate the melting of the base metal and the filler metal. The molten metal from the work-piece edges and the filler metal intermix in a common molten pool and join upon cooling to form one continuous piece.

Brazing and soldering are welding processes in which materials are joined by heating to a suitable temperature and by using a filler metal with a melting point below that of the base metal. The filler metal is distributed to the closely fitted surfaces of the joint by capillary action.

Resistance welding consists of a group of processes in which the heat for welding is generated by the resistance to the electrical current flow through the parts being joined, using pressure. It is commonly used to weld two overlapping sheets or sheets which may have different thicknesses. A pair of low resistance electrodes conducts electrical current through the sheets, forming a weld. The Key aspect of the resistance weld is that most of the resistance in the welding circuit is in the contact resistance where the metals are pressed together, so that most of the ($I^2*R$) heat is formed at the surfaces that are to be welded together.

The properties of a welded joint depend partly on the correct preparation of the edges being welded. Cleanliness is of key concern. All mill scale, rust, oxides, and other impurities must be removed from the joint edges or surfaces to prevent their inclusion in the weld metal. The edges should be prepared to permit fusion without excessive melting. Care must be taken to keep heat loss due to radiation into the base metal from the weld to a minimum. A properly prepared joint will keep both expansion on heating and contraction on cooling to a minimum.

Diffusion bonding is a method of joining metallic or non-metallic materials. This bonding technique is based on the atomic diffusion of elements at the joining interface. Diffusion process actually is the transport of mass in form of atom movement or diffusion through the lattice of a crystalline solid. Diffusion of atoms proceeds by many mechanisms, such as exchange of places between adjacent atoms, motion of interstitial atoms or motion of vacancies in a crystalline lattice structure. The latest is the preferable mechanism due to low activation energy required for atom movement. Vacancy is referred to an unoccupied site in a lattice structure. Both diffusion and direct contact bonding are preferable bonding methods. Direct Contact/Fusion bonding occurs when the surface atoms are brought within atomic distances with the application of pressure and heat. Any surface contamination will inhibit bonding.

Diffusion bonding involves diffusion of atoms via a thermodynamic process where temperature and diffusibility of the material are considerable parameters. In general, the diffusion rate, in term of diffusion coefficient D, is defined as $D=D_o^{-Q/RT}$, where $D_o$ is the frequency factor depending on the type of lattice and the oscillation frequency of the diffusing atom. Q is the activation energy, R is the gas constant and T is the temperature in Kelvin.

The activation energy for atomic diffusion at the surface, interface and grain boundaries is relatively low compared to the bulk diffusion due to a looser bond of the atoms and higher oscillation frequency of the diffusing atom. This enhances the atomic diffusion, and thus eases the diffusion bonding of two metal pieces assuming that a perfect interface contact exists.

Since diffusion bonding is driven by the diffusion of atoms, diffusion bonding process can be used to bond dissimilar materials that are difficult to weld, such as, steel and copper alloys. When bonding metals together, direct contact/fusion and diffusion bonding causes micro-deformation of surface features, due to the pressure and temperature applied, which leads to sufficient contact on an atomic scale to cause the materials to bond. However, before the materials can be joined they undergo an extensive preparatory treatment.

The interface contact can be optimized by a treatment of the surface to be bonded through a number of processes, such as mechanical machining and polishing, etching, cleaning, coating, and material creeping under high temperature and loading.

All of the above-mentioned bonding methods are problematic due to the inability to prevent contaminants from adhering to the bond site surfaces. Surface contamination causes poor bond adhesion, resulting in less robust bonds and therefore less reliable interfaces. Accordingly, much effort has gone into cleansing the surfaces of metals prior to being bonded.

Low temperature plasmas of various ionized gases can be used to reactively etch/ash organic materials found on the surface of materials. In this procedure, typically the material is placed in an RF cavity with a flowing reactive gas. The nature of the gas selected is chosen based upon the desired effect. Oxygen or argon is generally used, however, specific gases ($CF_4$) may be used to tailor the reaction for the desired effect. By removing surface contamination, plasma cleaning increases the bonding or adhesive properties of the bondsite surface.

A plasma is a collection of positive, negative, and neutral particles wherein typically the density of the negatively charged particles is equal to the density of the positively charged particles. When an energetic electron strikes a neutral gas molecule, it can cause dissociation and form free radicals and ions. The free radicals cause chemical reactions for destroying contaminants. For example, with oxygen, the dissociation process produces the free radical atomic oxygen (O). This reactive species has enough energy to break a carbon-carbon bond. When the plasma gas is a mixture of hydrogen and argon, for example, the free radical atomic oxygen (O) can therefore combine with the hydrogen ($H_2$) into water ($H_2O$).

Prior art plasma cleaning involves placing the workpieces to be bonded into a plasma chamber, creating a vacuum within the chamber by pumping out all the air from the chamber, introducing a gas or gaseous mixture into the chamber, and energizing the gas in the chamber to produce the plasma. In the presence of the plasma, organic contaminants on the bondsite surfaces are converted to carbon monoxide, carbon dioxide, water vapor, and/or other gasses, which are pulled out of the plasma chamber by a vacuum pump. After a predetermined amount of time, the gas flow and energy are shut off, and the chamber is then purged with a nonreactive gas, such as nitrogen, to remove all traces of volatile compounds. Finally, the chamber is returned to atmospheric pressure. A cleaning cycle usually lasts from between 30 seconds to 15 minutes or more and is largely a function of the workpiece loading in the plasma chamber.

An important application of plasma cleaning is the removal of aluminum oxide (sapphire) from the surface of aluminum to allow diffusion bonding. Oxygen has such a strong affinity for aluminum that in a normal atmosphere, pure aluminum becomes oxidized in seconds, forming a few atomic layers of aluminum oxide on the surface, preventing aluminum-to-aluminum bonding. Plasma bathing of the metal sheets reduces the surface aluminum oxide back to the original elemental aluminum, allowing bonding to take place.

Current metal diffusion methodologies have been unsuccessful for creating aluminum bonds, because of the difficulty of removing aluminum oxide chemically and because of the speed with which aluminum oxidizes. Further, the heating required to make the metal ductile enough to bond accelerates oxidation, which prevents bonding. With current, sequential, methods for cleaning, heating, and pressing bond surfaces, reoxidation prevents diffusion bonding of aluminum.

The current plasma cleaning methodology is problematic. First, immediately upon emerging from the plasma cleaning chamber, the cleaned workpiece(s) are re-exposed to surface contamination due to the organic particles in the air. In addition, the separate plasma cleaning chamber and equipment, coupled with the significant amount of time required to set up and execute the cleaning process, is quite costly.

It is therefore an object of the invention to provide a method for simultaneously heating, cleaning, and bonding materials together.

SUMMARY OF THE INVENTION

The present invention is a novel plasma enhanced bonding method and apparatus. The invention effectively generates a plasma bath, or "bubble", around the bonding surfaces of solid sheets to be bonded prior to and during the bonding action to thereby simultaneously heat, clean, and activate the surfaces of the materials that are to be bonded together, while the bonding is taking place.

In accordance with the invention, a pair of sheets to be bonded are positioned within close but non-contacting proximity to, and preferably in alignment with, one another. In a preferred embodiment, the sheets are fed by a sheet feeder between two compression rollers through which the sheets are compressed as they feed between the rollers. Prior to bonding the sheets together at their respective bonding surfaces, hot plasma is applied in a pressurized directional modulated flow at and between the bonding surfaces of the sheets to be bonded together to create a dynamic plasma cleaning chamber bubble. While continuing to apply the modulated plasma flow, the sheets are compressed by the rollers such that the bonding surfaces are brought into contact within atomic distances of one another at their respective bonding surfaces. The mere contact within atomic distances of the bonding surfaces of each sheet with one another while within the dynamic plasma cleaning chamber bubble allows contact bonding; however, diffusion bonding may be achieved by slowing the speed of the compression rollers sufficiently to apply pressure to the sheets therebetween over an appropriate amount of time. Furthermore, the rollers may optionally be heated to provide additional activation energy to achieve diffusion bonding of the sheets together. As the sheets exit from the compression rollers, the pressure is removed, resulting in a robust sheet-to-sheet bond.

Preferably, the plasma cleans and activates the surface while heating the bonding surfaces to allow direct contact bonding to take place as the clean metal surfaces are pressed together such that at least some of the surface atoms are brought within atomic distances of one another, and without melting the bonding surfaces. This eliminates the need for an additional heating mechanism for heating the bonding surfaces.

In a particular application, the inventive process makes it possible to diffusion bond aluminum sheets because the cleaning steps are performed prior to and simultaneously with the bonding. This does not allow recontamination between the preparation of the surfaces and the bonding itself.

Accordingly, the present invention advantageously provides a novel technique that cleans the surfaces to be bonded as they are bonded to eliminate any contaminants from being introduced into the final bond, thereby improving the bond adhesion properties. The invention not only allows differing metals to be bonded together, but may also allow materials to be bonded together that prior to the present invention were difficult to bond due to contaminant compounds formed at the bond site, which resulted in weaker bonds. In addition to the above-named advantages, the temperature of the plasma/hot gas is high enough that the press need not include a heater. The invention essentially provides "localized" heating directed only at the bonding surfaces, thereby reducing the risk of damage to the sheets to be bonded as well as to any components attached to the sheets. The invention also makes possible the bonding of non-metallic materials such as sapphire, silicon, ceramic, and quartz materials in a similar manner. The direct contact bonding method only requires that the surface finish, temperature, and pressure are adequate for enough of the contact surface to be brought close enough together for the atoms from one surface to bond the atoms in the opposite surface while a modulated stream of intense plasma cleans, heats, and activates those surfaces as the contact happens.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A method and apparatus for plasma enhanced circuit packaging that supports the simultaneous heating, cleaning, and bond activation of the bonding surfaces of sheets to be bonded is achieved by maintaining the entire bond site in a dynamic plasma cleaning chamber bubble is described in detail hereinafter. Although the invention is described using certain preferred bonding materials, gaseous plasmas, and bonding apparatus configurations, it is to be understood that other bonding materials and gasses having similar bondability characteristics and other bonding apparatus configurations that achieve the same results are intended to be covered by the claims appended hereto.

Figure 8:
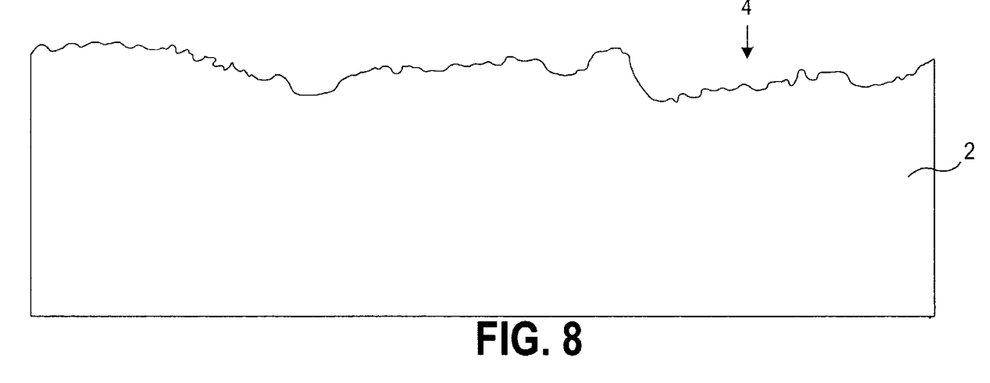
FIG. 8 is a cross-sectional side view of the sheet of FIG. 7 after plasma cleaning has occurred.
Figure 9:
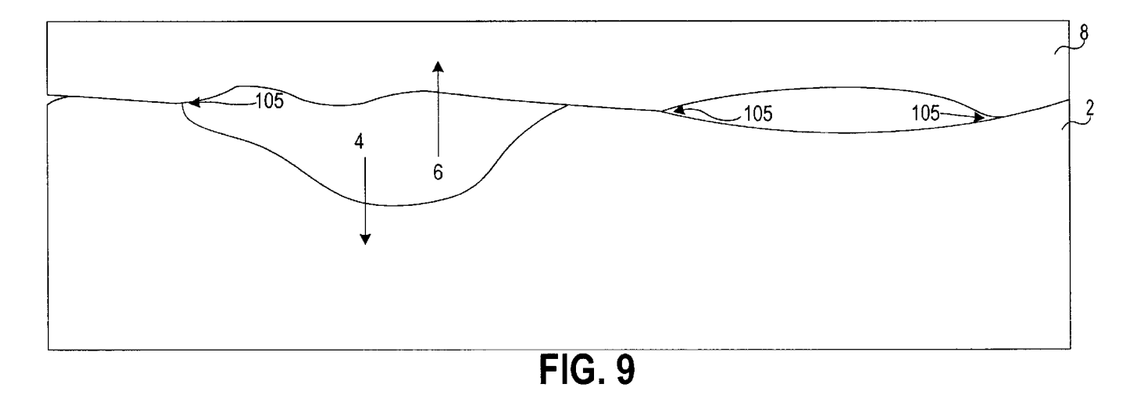
FIG. 9 is a cross-sectional side view of the cleaned sheet of FIG. 8 after direct contact bonding with another plasma cleaned sheet has occurred.
Figure 10:
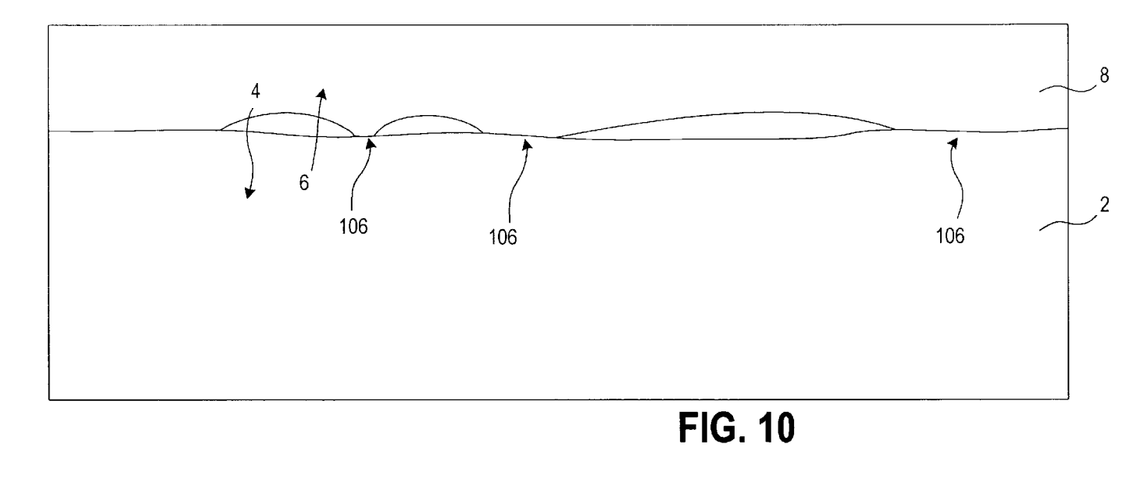
FIG. 10 is a cross-sectional side view of the direct contact bonded sheet of FIG. 9 after some diffusion has occurred.
Figure 11:
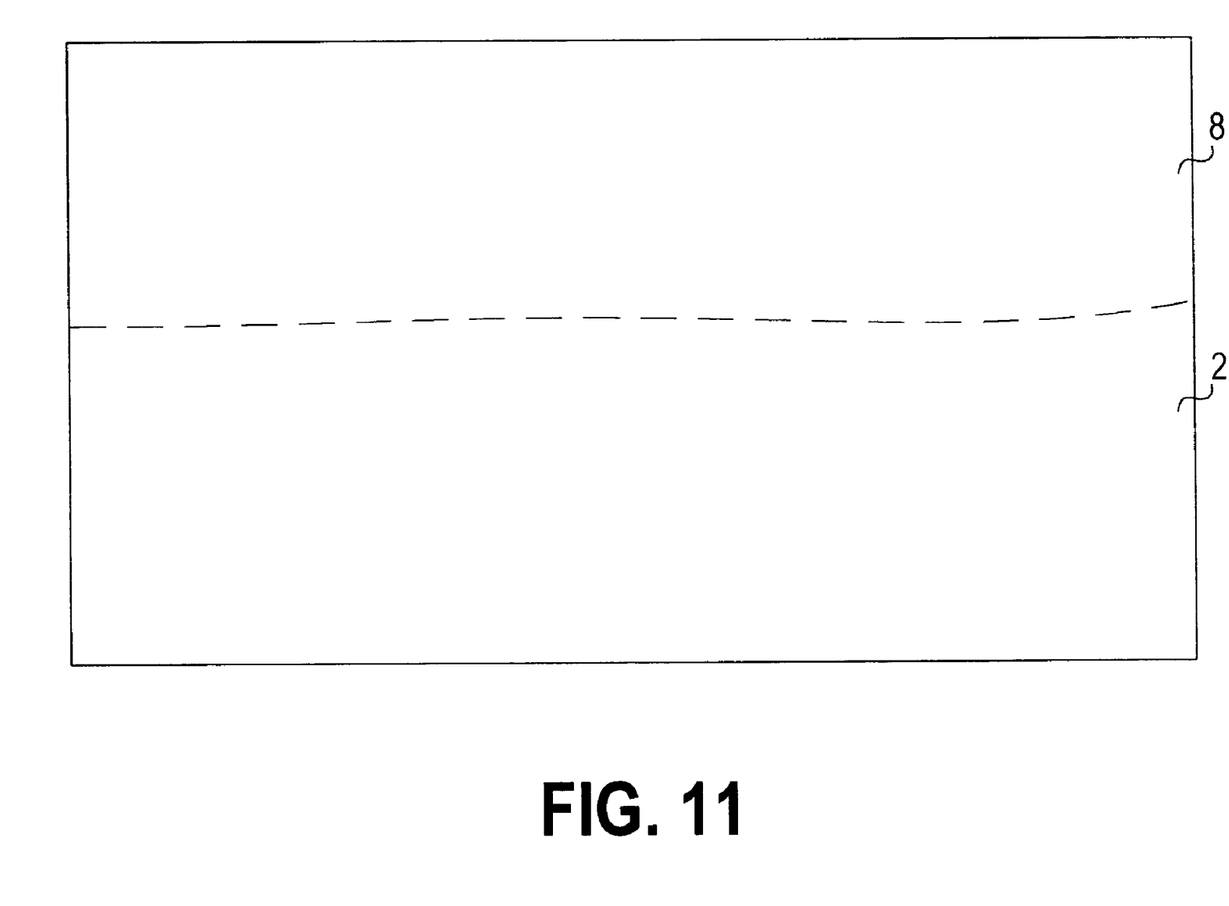
FIG. 11 is a cross-sectional side view of the sheets of FIG. 10 after full diffusion bonding has occurred.

FIGS. 8–12 illustrate the principles effected by the invention. FIG. 8 is a cross-sectional side view of a portion of a contaminated sheet 2 (e.g., aluminum) to be bonded shown at the molecular level. As illustrated, at the molecular level, the surface 4 of the sheet is not smooth, but rather comprises a rough contour with surface variation on the order of 1000 nm. The variation at the surface finish is on the order of 200 nm. Surface 4 is contaminated by various contaminants, for example organic liquid such as machining oil, solid contaminants such as silica dust or epoxy, and oxides. After plasma cleaning, all of organic and inorganic contaminants are removed, as illustrated in FIG. 9. Once cleaned, direct contact bonding may occur with another cleaned sheet, 8, as illustrated in FIG. 10. As shown, the surfaces 4 and 6 of the sheets 2 and 8 form direct contact bonds where the surfaces meet when compressed. Diffusion of the molecules near the surfaces 4 and 6 occur after additional time, pressure, and heating, as illustrated in FIG. 11. After sufficient time, pressure, and heating, full diffusion takes place, as illustrated in FIG. 12, to result in a perfect lattice structure.

Figure 1:
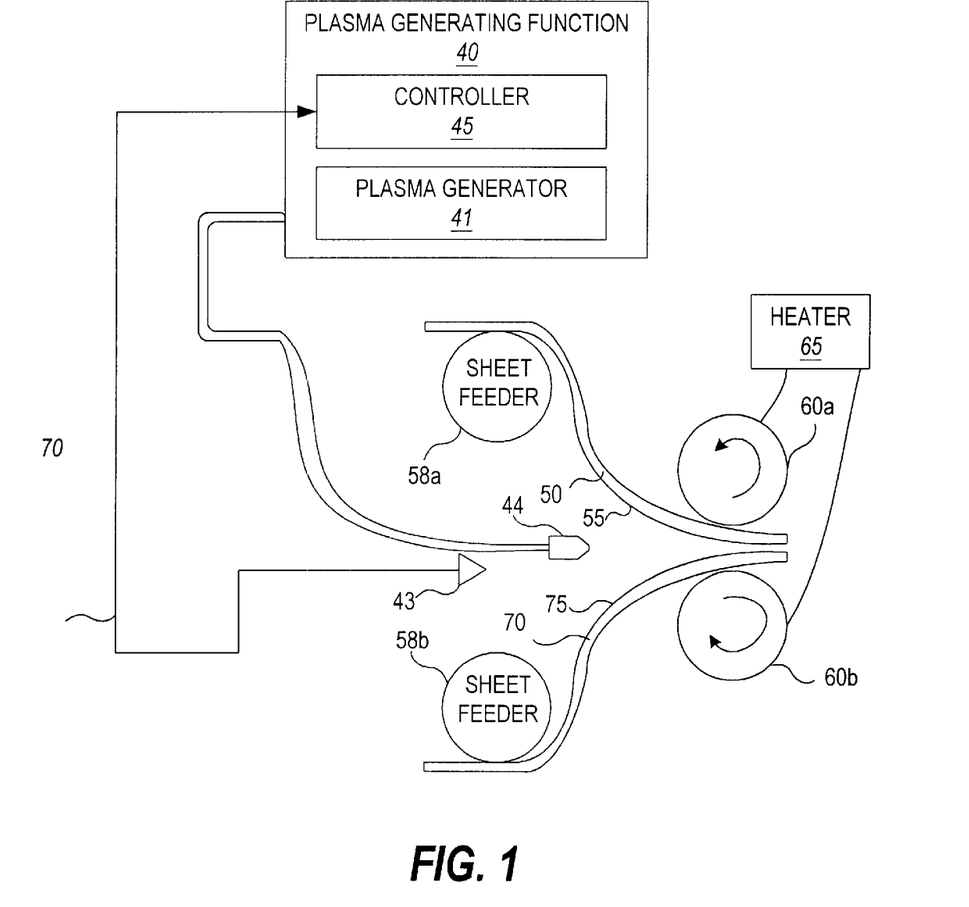
FIG. 1 is a block diagram of a plasma enhanced sheet bonder implemented in accordance with the invention.

Turning now to FIG. 1, there is shown a plasma enhanced sheet bonder 10 implemented in accordance with the invention. Plasma enhanced bonder 10 includes a bonding function 20 and plasma generator function 40. Bonding function 20 includes at pair of compression rollers 60a, 60b. In accordance with the invention, a pair of sheets 50 and 70 to be bonded are positioned within close but non-contacting proximity to, and preferably in alignment with, one another. In a preferred embodiment, the sheets 50 and 70 are fed by a sheet feeder 52 and 72 between two compression rollers 60a, 60b through which the sheets are compressed as they feed between the rollers. Prior to bonding the sheets together at their respective bonding surfaces, hot plasma 82 is applied in a pressurized directional modulated flow (plasma bullets 84) at and between the bonding surfaces 55 and 75 of the sheets 50 and 70 to be bonded together to create a dynamic plasma cleaning chamber bubble 90. While continuing to apply the modulated plasma flow, the sheets 50 and 70 are compressed by the rollers 60a, 60b such that the bonding surfaces 55 and 75 are brought into contact within atomic distances of one another at their respective bonding surfaces. The mere contact within atomic distances of the bonding surfaces 55 and 75 of each sheet 50 and 70 with one another while within the dynamic plasma cleaning chamber bubble 90 allows contact bonding; however, diffusion bonding may be achieved by slowing the speed of the compression rollers 60a, 60b sufficiently to apply pressure to the sheets therebetween over an appropriate amount of time. Furthermore, the rollers 60a, 60b may optionally be heated by internal roller heater 66 to provide additional activation energy to achieve diffusion bonding of the sheets together. As the sheets 50 and 70 exit from the compression rollers, the pressure is removed, resulting in a robust sheet-to-sheet bond.

Preferably, the plasma cleans and activates the surface while heating the bonding surfaces to allow direct contact bonding to take place as the clean metal surfaces are pressed together such that at least some of the surface atoms are brought within atomic distances of one another, and without melting the bonding surfaces. This eliminates the need for an additional heating mechanism, such as 65 in rollers 60a, 60b for heating the bonding surfaces.

In a particular application, the inventive process makes it possible to diffusion bond aluminum sheets because the cleaning steps are performed prior to and simultaneously with the bonding. This does not allow recontamination between the preparation of the surfaces and the bonding itself. Plasma enhanced bonder 10 operates to bond bondable materials, such as metals and certain non-metals, together. In the preferred embodiment, aluminum sheets are bonded together.

Figure 2A:
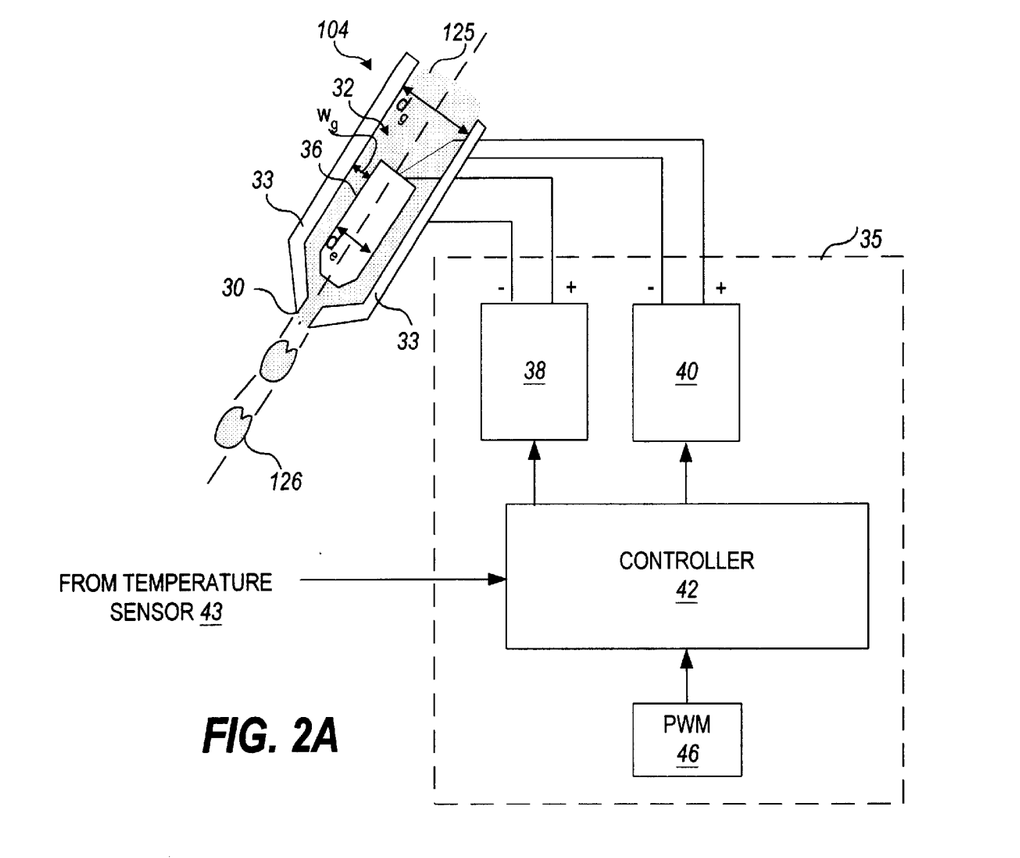
FIG. 2A is a side cross-sectional view of a preferred embodiment of the plasma gun used in the metal bonder of the invention.
Figure 2B:
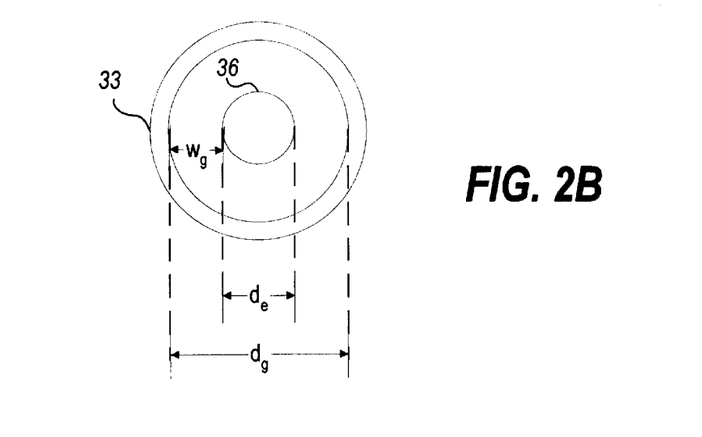
FIG. 2B is a concentric cross-sectional view of the preferred embodiment plasma gun of FIG. 2A.
Figure 3:
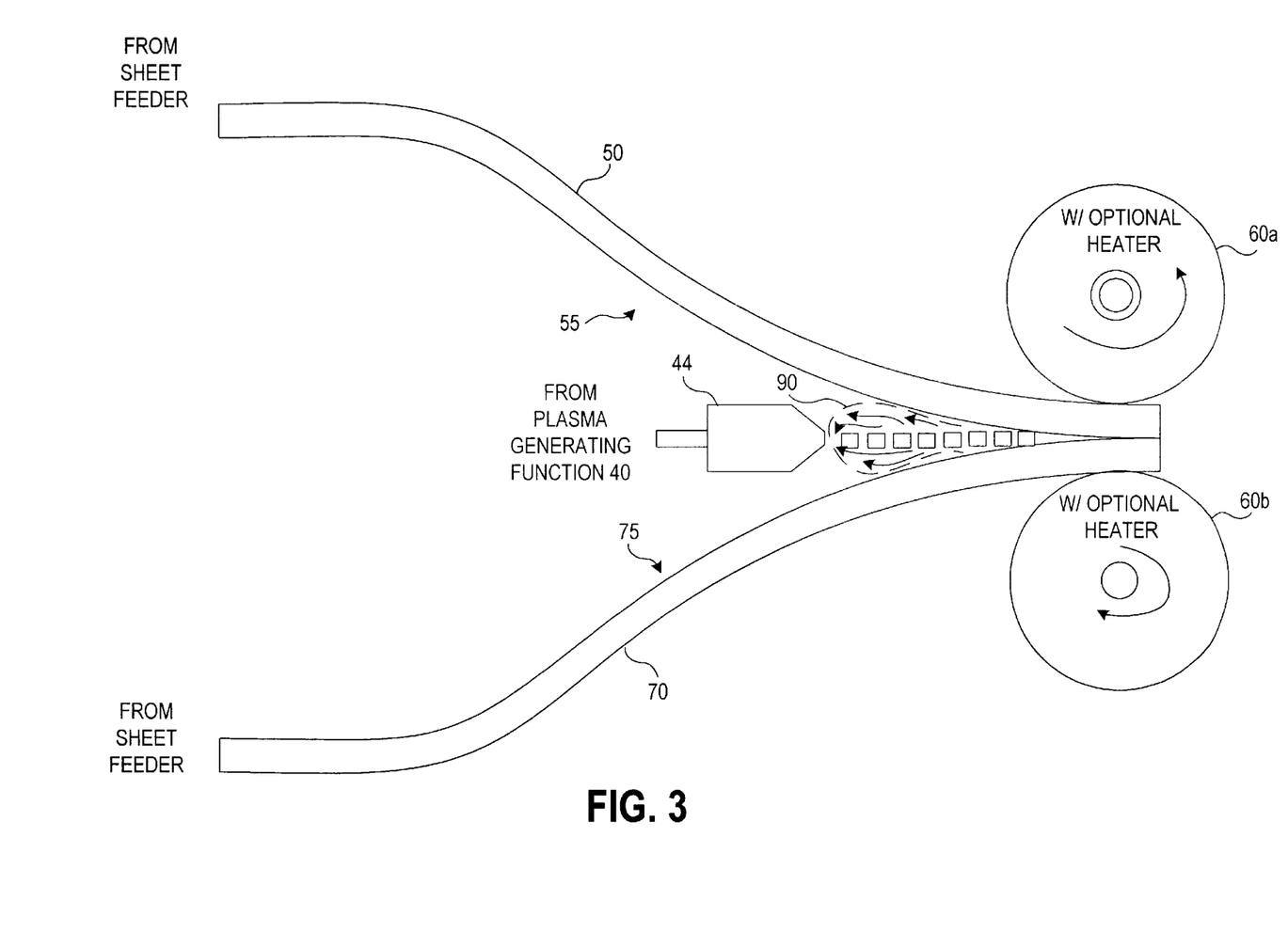
FIG. 3 is a side view of a sheet bonder implemented in accordance with the invention illustrating the formation of a dynamic cleaning chamber bubble around the bond site.

Plasma generating function 40 includes a plasma generator 41, a plasma gun array 42, a temperature sensor 43, and a controller 45. Plasma gun array 42 comprises a plurality of plasma guns 44 arranged in a linear array around the peripheral edges of the sheets 70. The array 42 may be attached to the rack 24, or attached independently of the rack. In the preferred embodiment, each plasma gun 44, as shown in FIGS. 2A and 2B, comprises a hollow coaxial bore 32 through which a steady stream of gas is supplied by a gas supply 46. In the preferred embodiment, gas 80 is a noble gas such as argon, which may optionally be a gaseous mixture such as 95% argon with 5% oxygen or hydrogen. Gas 80 is output from the plasma guns 44 between the bonding surfaces as hereinafter described, forming a dynamic plasma cleaning chamber bubble 90 around the bonding site, as illustrated in FIG. 3. Gas 80 is pulse stimulated by an energizing circuit 48, which ionizes the gas to form hot plasma 82. Bore 32 is shaped aerodynamically to shoot a laminar stream of the hot plasma through a tip 30 at the end opposite of the plasma gun 44 in a directional pressurized flow toward the bonding site. The ions of the hot plasma recombine across the distance between the plasma gun tip 30 and the bonding site to form hot gas. The recombination is optional and is desirable merely to ensure that charge build-up does not occur on the surface of the device being bonded. The effect of the plasma and the hot reactant gasses (such as $H_2$ or $O_2$) is that the bonding surfaces (i.e., the bonding edges 53 and peripheral surfaces 74) are simultaneously heated and cleaned immediately before and during the bonding step as described in more detail hereinafter.

In the preferred embodiment, gas 80 flows continuously through the bore 32 of the plasma gun 44 at the end of the coaxial bore opposite that of the tip 30 under the control of the plasma generator 41. Gas 80 is energized by energizing circuit 48 to form plasma 82. Energizing circuit 48 generates the energy to create the plasma, and is preferably generated either by a direct current voltage or by radio frequency in the range of 1 KHz to 100 GHz.

Figure 5:
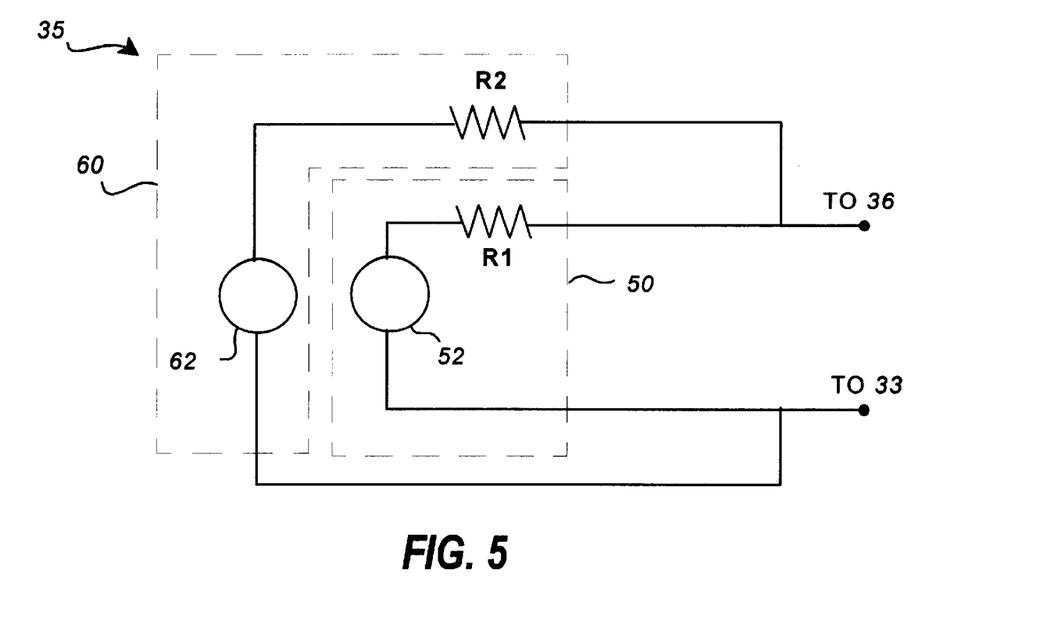
FIG. 5 is a schematic diagram of an illustrative embodiment of a plasma energizing circuit used in the sheet bonder of the invention.

In the illustrative embodiment, energizing circuit 48 is implemented using a high voltage DC circuit 38 that sparks the initial ionization of the argon gas 80 within the plasma gun 44. A secondary low voltage DC circuit 40 continues the ionization of the gas once the initial ionization spark begins. The ionization of the gas 80 occurs periodically to form a periodic output stream of hot pulses (or "bullets") of plasma. The temperature of the bond site is monitored using a temperature sensor 43 such as an infrared detector. Temperature sensor 43 is coupled to controller 45 which uses the data received from the sensor 43 to maintain the temperature at the desired level. Preferably, the temperature is high enough to allow direct contact fusion/diffusion bonding to take place to thereby eliminate the need for a heater as part of the bonding device (press). In the preferred embodiment, this temperature level is approximately 150° C., but in any case it is lower than the melting temperature of the package lid and circuit board metals that are to be bonded together.

Figure 4:
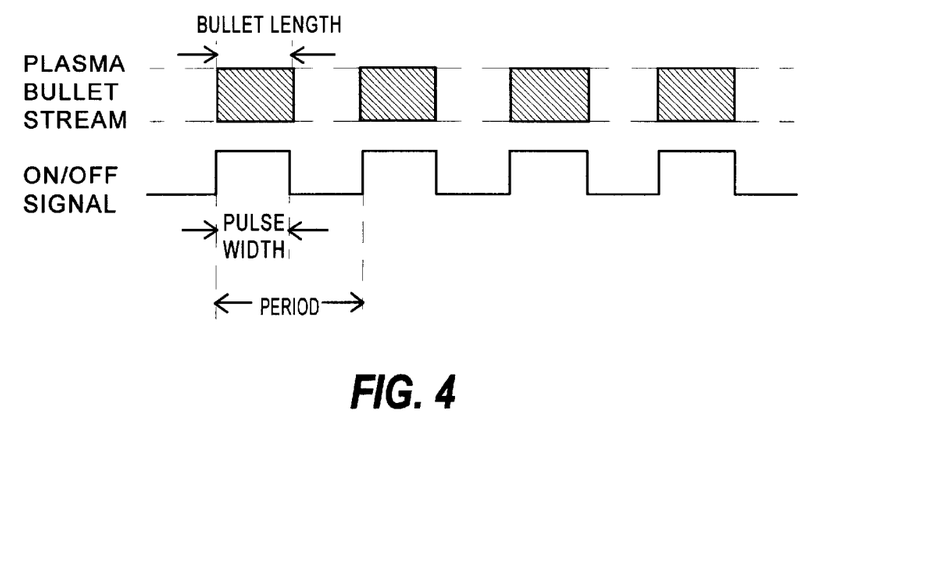
FIG. 4 is a graph illustrating the relationship between the frequency and duty cycle of the energizing circuit and the frequency and length of the plasma bullets.

The plasma bullets 84 are formed in the preferred embodiment by turning on and off the energizing circuit 48. The repetition rate and length of the plasma bullets are controlled via controller 42, which preferably uses a pulse width modulator 46 to control the duty cycle of the energizing circuit 48 to maintain a peak energy that is high enough to guarantee heating and cleansing of the bonding surfaces. In the preferred embodiment, the frequency and length of plasma bullets in the plasma stream is adjusted by design to fit the application. Furthermore in the preferred embodiment, the frequency and length of the plasma bullets is controlled according to temperature feedback from sensor 43. FIG. 4 is a graph illustrating the relationship between the frequency and duty cycle of the ON/OFF signal that controls the energizing circuit 48 and the frequency and length of the plasma bullets. As shown, the length of the plasma bullet is proportional to the width of the ON/OFF pulse in the on position. The frequency of the plasma bullets is directly related to the period of the ON/OFF signal.

It will be appreciated by those skilled in the art that since the array 42 of plasma guns 44 are aimed at the bonding site—namely the bonding surfaces 74 of the sheets 70, the plasma bath, and therefore the cleaning and thermal heating, occurs only at the site of the surfaces to be bonded. This prevents damage to, and eliminates unnecessary cleaning of, the remaining portions of the sheets 70 and any components attached thereto (not shown). The directional flow of plasma acts as a dynamic cleaning chamber 90 or "bubble" around the bond site, as illustrated in FIG. 2B, and once the bonding surfaces 74 are cleaned, the modulated plasma stream remains until the bonding is complete so that the outward flowing pressure from the gaseous bubble forces air out of the area of the bubble chamber and prevents air from re-entering the area enclosed within the bubble. Accordingly, the bonding surfaces 74 do not become recontaminated during the actual bonding. In operation, when the hot plasma bullets 84 come in contact with the surfaces to be bonded, they perform cleaning by performing one or more of the following actions, including vaporization, reduction, or oxidation, depending on the type of metals to be bonded and the gas or gaseous mixture chosen for the application.

When the gas or gaseous mixture contains a noble gas, such as argon, the noble gas molecules do not easily recombine with molecules containing other elements. Thus, when the noble gas molecules are heated to a high enough energy, the noble gas molecules operate only to break the bonds between surface contaminant molecules and the bond site molecules. This is due to the force of the hot (and therefore high speed) noble gas molecules when colliding with the surface contaminant molecules, which cause the surface contaminant molecules to break away from the bond site surface into free air. This operation is termed herein "vaporization".

When the gas or gaseous mixture contains a more recombinant gas, such as hydrogen ($H_2$), the recombinant gas molecules easily recombine with surface contaminant molecules. Thus, when the recombinant gas combines with surface contaminant molecules, the surface contaminants are converted, or reduced, to another form. For example, if the gas is a mixture of argon and hydrogen, and the surface contaminants are silicon dioxide ($SiO_2$), the hydrogen combines with the oxygen molecules to form water ($H_2O$) and oxygen, thereby reducing the surface contaminants to pure silicon (Si). This process is termed herein "reduction". The remaining surface contaminants can be vaporized by the noble argon gas molecules in the gaseous mixture as described above.

When the gas or gaseous mixture contains oxygen ($O_2$), the oxygen can combine with the surface contaminant molecules to "oxidize" or essentially "burn" away any contaminants present on the surfaces such as aluminum oxide.

In addition to cleaning, the plasma that forms the bubble chamber around the bond site simultaneously activates the bonds of the surface molecules at the bond sites so that surface molecules of both bonding surfaces 74 to be bonded together are activated to allow the same or different materials to more easily fuse together. In particular, the plasma/hot gas breaks the surface bonds of each of the respective bonding surfaces so that they are ready to rebond with the molecules of the other surface.

It will be appreciated that this novel technique of simultaneously cleaning the surfaces, activating the bonds of the surface atoms, and preventing contaminants from recontaminating the bonding surfaces during the bonding process allows metals that heretofore could not be bonded together to be bonded.

FIG. 5 is a schematic diagram of an illustrative embodiment of the plasma energizing circuit 48 that serves to ionize the argon to form hot plasma. In the illustrative embodiment, energizing circuit 48 uses direct current techniques to energize the gas, and includes an ionization initiation circuit 50 and a high-current circuit 60. Ionization circuit 50 is a high impedance/high voltage power supply which is schematically represented with a DC power supply 52 and a resistor R1. Referring back to FIGS. 2A and 2B, central electrode 36 has a diameter $d_e$ which is a predetermined length less than the diameter $d_g$ of the inner coaxial hollow bore 32. Electrode 36 is arranged coaxially within hollow bore 32, such that a hollow gap $w_g$ is formed concentrically and of even width around the electrode 36 along the coaxial axis. Gap width $w_g$ is defined by $d_g-d_e$, preferably at every point around the coaxial axis.

Referring back to FIG. 5, ionization circuit 50 is a high-voltage, low-current-limited series circuit, which yields high potential across the argon stream flowing through the hollow bore 32 between the electrode 36 and plasma gun walls 33. The design of the ionization is such that it delivers a high enough electric potential across the argon gap $w_g$ to result in ionization of the argon atoms as they pass through the gap. It will be appreciated by those skilled in the art that although ionization is achieved using a high-voltage, low-current-limited circuit, the temperature of the argon gas flowing out the tip 30 of the plasma gun and onto the surface of the bond site is still relatively low due to the limited power delivered to the gas across the gap $w_g$.

Accordingly, high-current circuit 60 is provided to maintain sufficient heat so as to allow the argon atoms to clean the surfaces of the bond site. In the illustrative embodiment, high-current circuit 60 is coupled in parallel with ionization circuit 50, and comprises a DC power supply 62 with a source impedance R2 (<<R1) between central electrode 36 and the outer wall 33 of plasma gun 44. High-current circuit 60 is a low-voltage power source which yields high power across the gap $w_g$ in which the argon stream flows through the hollow bore 32 between the electrode 36 and plasma gun walls 33. The high-current circuit 60 delivers lower voltage across the gap due to the drop in impedance of the ionized gas. This second power supply circuit 60 delivers the bulk of the energy to the gas.

As an illustrative example, if power supply 52 is a 20 KV DC supply initiates ionization and R1 is 1 Mohm (which limits the current to 20 mA). The resistance of the argon across the gap is large before ionization. However, now that the plasma has been ionized the lower voltage high current power supply can be initiated to supply the energy to create the working plasma. This ignition process is similar to using a low power flint spark to fire up a high energy output gas torch. Accordingly, the design of the high-current circuit 60 may be such that power supply 62 is an adjustable supply of approximately 5 to 40 V DC and R1 is near zero Ohms (which allows high output current limited only the voltage supplied and the plasma resistance itself to Vapplied/Plasma Resistance). If the resistance across the gap is 2 ohms, and the power supply voltage is set to 20 volts then the plasma arc current is I=20/2, I=10 amps, then the power delivered across gap $w_g$ is $P=I^2*R=(10 A)^2 * 2$ Ohms=200 W, which is enough power to raise the temperature of the gas atoms to a level sufficient to perform surface cleaning and bonding. In actual practice the power delivered to the plasma will be set for each package and lid to obtain the optimum sealing bond w/o damaging the sealing metals or the surrounding circuitry. Once this peak power is set the final bonding temperature is set, as mentioned earlier, by monitoring the surfaces to be bonded with an IR temperature sensor between the "plasma bullets" and feeding this temperature back to the controller which adjust the pulse width modulator to maintain the optimum bonding surface temperature.

A critical factor in successful plasma cleaning is the choice of a process gas. If the correct gas is chosen, optimum contaminant removal is achieved, and the potential for undesirable substrate oxidation is minimized. Although the invention has been described using argon gas or an argon/oxygen mixture, other suitable gasses or gaseous mixtures may also be employed. Some other exemplary gases, such as hydrogen $H_2$ or carbon tetra-fluoride $CF_4$, possess desirable characteristics for plasma cleaning. Gas selection may vary according to cleaning requirements for a specific substrate, bonding metals, contaminant, application, or process.

In addition, various non-metal solid materials may also be bonded using the present invention (for example, glass to silicon, metal wire to fused quartz, sapphire to quartz).

Figure 6:
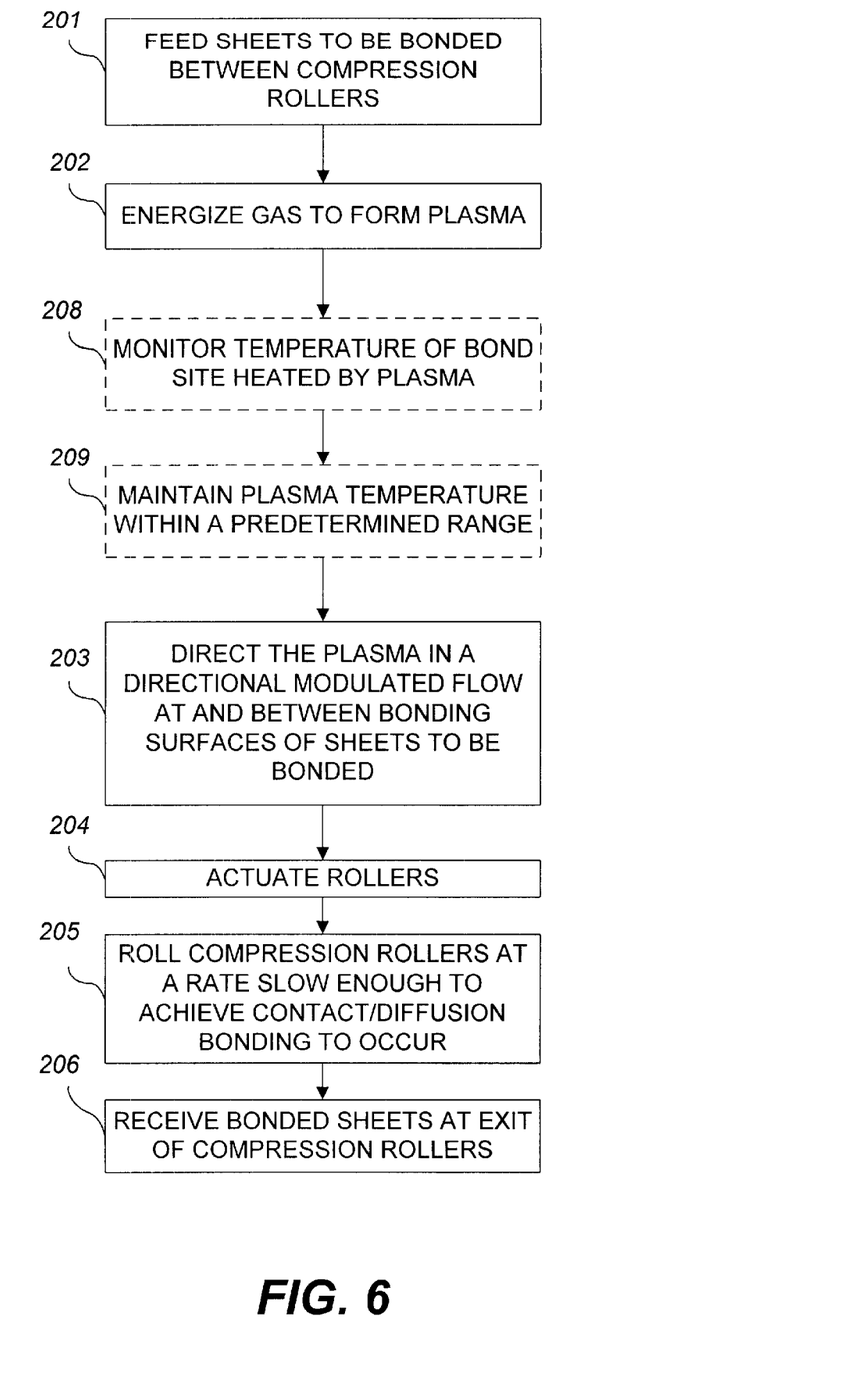
FIG. 6 is an operational flowchart of a method in accordance with the invention.
Figure 7:
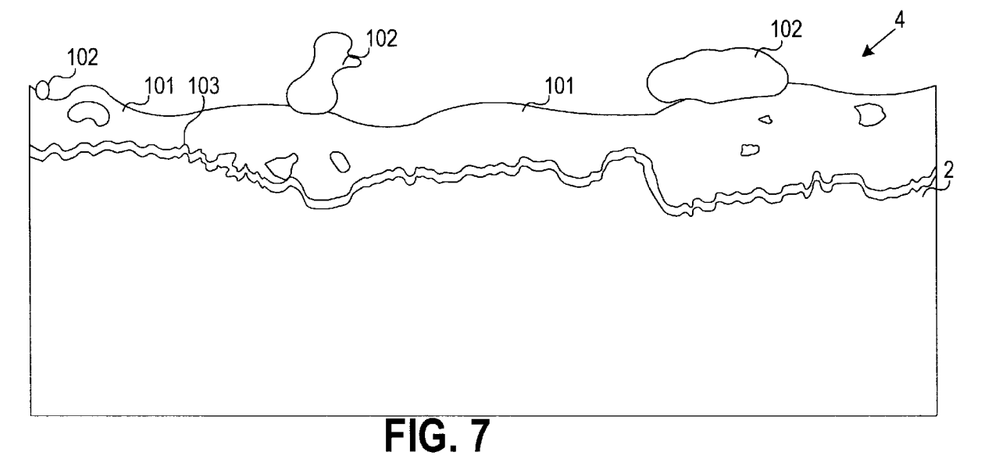
FIG. 7 is a cross-sectional side view of a contaminated sheet to be bonded shown at the molecular level.

FIG. 6 is an operational flowchart of a method in accordance with the invention for simultaneously cleaning and bonding solid sheets together. In accordance with the method of the invention, one or more sheets 70 are placed with bonding surfaces facing one another between compression rollers (step 201). In the preferred embodiment, the sheets are fed by automated sheet feeders (not shown). A gas is energized (step 202) to form a plasma. The plasma is directed (step 203) in a directional pressurized modulated flow at and between the bonding surfaces 74 of the sheets to form a dynamic plasma cleaning chamber bubble around and between the bonding surfaces 55 and 75 of the sheets 50 and 70. The compression rollers are then actuated (step 204) to compress the sheets 50 and 70 together such that at least some of the surface molecules of each of the bonding surfaces 55, 75 of the sheets 50, 70 come within atomic distance with one another. Preferably, the sheets 50, 70 are compressed together with sufficient force and with sufficient heat over sufficient time to allow full diffusion bonding to occur. Preferably this is achieved by adjusting the rolling rate of the compression rollers 60*a*, 60*b* to a rate slow enough (step 205) to allow bonding to occur. The bonded sheets are received at the exit of the compression rollers (step 206). Preferably, the temperature of the bond site heated by the plasma/hot gas is set to a predetermined temperature (e.g., a value within the range of 150° C. to 400° C.) and is monitored (step 208) and maintained (step 209) within a predetermined range (e.g., + or −10° C. of the predetermined temperature) so as not to melt or damage the underlying materials of the sheets to be bonded.

The present invention as described in detail above is advantageous over the prior art in several respects. First, the bonding surfaces of the package lid and circuit board are cleaned as they are bonded to eliminate any contaminants from being introduced into the final bond, thereby improving the integrity of the bond. Secondly, because the temperature of the bonding surfaces heated by the plasma/hot gas as it the plasma/hot gas hits the surfaces to be bonded is high enough, the press device itself need not necessarily include a heater, thereby providing "localized" heating to reduce the risk of accidentally damaging any of the circuitry components on the board.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A plasma enhanced sheet bonder, comprising:
    a first compression roller;
    a second compression roller operating with said first compression roller to feed and simultaneously compress a first sheet and a second sheet between said first compression roller and said second compression roller;
    a plasma generator which applies a modulated directional flow of plasma at and between a bonding surface of said first sheet and a bonding surface of said second sheet, wherein said modulated directional flow of plasma is directed at and between said bonding surfaces of said first and second sheets prior to and during said compression of said bonding surfaces by said compression rollers.

2. A plasma enhanced sheet bonder in accordance with claim 1, wherein:
    said plasma heats said bonding surface of said first sheet and said bonding surface of said second sheet to a predetermined temperature.

3. A plasma enhanced sheet bonder in accordance with claim 2, comprising:
    a temperature sensor which monitors a temperature of said bonding surfaces; and
    a heat adjustment controller which adjusts said pressurized directional flow of plasma to maintain said temperature of said bonding surfaces within a predetermined range.

4. A plasma enhanced sheet bonder in accordance with claim 3, wherein:
    said heat adjustment controller adjusts said pressurized directional flow of plasma by pulse-width modulating said pressurized directional flow of said plasma to generate a stream of plasma bullets having a frequency and duty cycle adjustable according to an amount of said pulse-width modulating.

5. A plasma enhanced sheet bonder in accordance with claim 2, wherein said temperature is less than a melting temperature of either of said first material of said first sheet and said second material of said second sheet.

6. A plasma enhanced sheet bonder in accordance with claim 2, wherein said temperature is approximately ¾ the melting temperature of at least one of said first material of said first sheet and said second material of said second sheet.

7. A plasma enhanced sheet bonder in accordance with claim 1, further comprising:
    a heating apparatus which heats said bonding surface of said first sheet to a first predetermined temperature and said bonding surface of said second sheet to a second predetermined temperature.

8. A plasma enhanced sheet bonder in accordance with claim 7, comprising:
    a temperature sensor which monitors a temperature of said bonding surfaces; and
    a heat adjustment controller which adjusts said heating apparatus to maintain said temperature of said bonding surfaces within a predetermined range.

9. A plasma enhanced sheet bonder in accordance with claim 7, wherein said first predetermined temperature is less than a melting temperature of said first material of said first sheet and said second predetermined temperature is less than a melting temperature of said second material of said second sheet.

10. A plasma enhanced sheet bonder in accordance with claim 7, wherein said first predetermined temperature is approximately ¾ the melting temperature of said first material of said first sheet and said second predetermined temperature is approximately ¾ the melting temperature of said second material of said second sheet.

11. A plasma enhanced sheet bonder in accordance with claim 1, wherein:
    a combination of heat and compression force between said first compression roller and said second compression roller is sufficient to allow diffusion bonding to occur between said bonding surface of said first sheet and said bonding surface of said second sheet.

12. A plasma enhanced sheet bonder for bonding a first surface of a first sheet of a first material to a second surface of a second sheet of a second material, comprising:
    a compressor which compresses said bonding surface of said first sheet against said bonding surface of said second sheet;
    a plasma generator which applies a modulated directional flow of plasma at and between said bonding surface of said first sheet and said bonding surface of said second sheet prior to and during compression of said bonding surface of said first sheet against said bonding surface of said second sheet by said compressor.

13. A plasma enhanced sheet bonder in accordance with claim 12, comprising:
    a feeder which feeds said first surface of said first sheet and said second surface of said second sheet into said compressor.

14. A plasma enhanced sheet bonder in accordance with claim 12, wherein:
    said plasma heats said bonding surface of said first sheet and said bonding surface of said second sheet to a predetermined temperature.

15. A plasma enhanced sheet bonder in accordance with claim 14, comprising:
- a temperature sensor which monitors a temperature of said bonding surfaces; and
- a heat adjustment controller which adjusts said pressurized directional flow of plasma to maintain said temperature of said bonding surfaces within a predetermined range.

16. A plasma enhanced sheet bonder in accordance with claim 15, wherein:
- said heat adjustment controller adjusts said pressurized directional flow of plasma by pulse-width modulating said pressurized directional flow of said plasma to generate a stream of plasma bullets having a frequency and duty cycle adjustable according to an amount of said pulse-width modulating.

17. A plasma enhanced sheet bonder in accordance with claim 14, wherein said temperature is less than a melting temperature of either of said first material of said first sheet and said second material of said second sheet.

18. A plasma enhanced sheet bonder in accordance with claim 14, wherein said temperature is approximately ¾ the melting temperature of at least one of said first material of said first sheet and said second material of said second sheet.

19. A plasma enhanced sheet bonder in accordance with claim 12, further comprising:
- a heating apparatus which heats said bonding surface of said first sheet to a first predetermined temperature and said bonding surface of said second sheet to a second predetermined temperature.

20. A plasma enhanced sheet bonder in accordance with claim 19, comprising:
- a temperature sensor which monitors a temperature of said bonding surfaces; and
- a heat adjustment controller which adjusts said heating apparatus to maintain said temperature of said bonding surfaces within a predetermined range.

21. A plasma enhanced sheet bonder in accordance with claim 19, wherein said first predetermined temperature is less than a melting temperature of said first material of said first sheet and said second predetermined temperature is less than a melting temperature of said second material of said second sheet.

22. A plasma enhanced sheet bonder in accordance with claim 19, wherein said first predetermined temperature is approximately ¾ the melting temperature of said first material of said first sheet and said second predetermined temperature is approximately ¾ the melting temperature of said second material of said second sheet.

23. A plasma enhanced sheet bonder in accordance with claim 12, wherein:
- a combination of heat and compression force between said first compression roller and said second compression roller is sufficient to allow diffusion bonding to occur between said bonding surface of said first sheet and said bonding surface of said second sheet.

24. A method for bonding a surface of a first sheet of a first material to a surface of a second sheet of a second material, comprising:
- generating a modulated directional flow of plasma;
- applying said modulated directional flow of plasma at and between said bonding surface of said first sheet and said bonding surface of said second sheet; and
- compressing said bonding surface of said first sheet against said bonding surface of said second sheet, wherein said modulated directional flow of plasma is maintained prior to and during said compression of said bonding surfaces.

25. A method in accordance with claim 24, comprising:
- heating said plasma to a temperature sufficient to heat said bonding surface of said first sheet and said bonding surface of said second sheet.

26. A method in accordance with claim 25, wherein said temperature is less than melting temperature of either of said first material of said first sheet and said second material of said second sheet.

27. A method in accordance with claim 26, wherein said temperature is approximately ¾ the melting temperature of at least one of said first material of said first sheet and said second material of said second sheet.

28. A method in accordance with claim 24, comprising:
- heating said bonding surface of said first sheet to a first predetermined temperature; and
- heating said bonding surface of said second sheet to a second predetermined temperature.

29. A method in accordance with claim 28, wherein said first predetermined temperature is less than a melting temperature of said first material of said first sheet and said second predetermined temperature is less than a melting temperature of said second material of said second sheet.

30. A method in accordance with claim 28, wherein said first predetermined temperature is approximately ¾ the melting temperature of said first material of said first sheet and said second predetermined temperature is approximately ¾ the melting temperature of said second material of said second sheet.

31. A method in accordance with claim 24, comprising:
- heating said bonding surface of said first sheet and said bonding surface of said second sheet; and
- wherein said heating and said compressing is sufficient to allow diffusion bonding to occur between said bonding surface of said first sheet and said bonding surface of said second sheet.

32. A method in accordance with claim 24, comprising:
- monitoring a temperature of said bonding surfaces;
- maintaining said temperature of said bonding surfaces within a predetermined range.

33. A method in accordance with claim 32, said maintaining step comprising:
- modulating said pressurized directional flow of said plasma to maintain said temperature of said bonding surfaces within a predetermined range.

34. A method in accordance with claim 33, said modulating step comprising:
- pulse-width modulating said pressurized directional flow of said plasma to generate a stream of plasma bullets having a frequency and duty cycle adjustable according to an amount of said pulse-width modulating.

* * * * *